United States Patent
Tanaka et al.

(10) Patent No.: US 9,783,234 B2
(45) Date of Patent: Oct. 10, 2017

(54) SUB FRAME STRUCTURE OF VEHICLE

(71) Applicant: MAZDA MOTOR CORPORATION, Hiroshima (JP)

(72) Inventors: Masaaki Tanaka, Hiroshima (JP); Katsuyuki Komiya, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/986,909

(22) Filed: Jan. 4, 2016

(65) Prior Publication Data

US 2016/0207570 A1    Jul. 21, 2016

(30) Foreign Application Priority Data

Jan. 16, 2015    (JP) .................................. 2015-006991

(51) Int. Cl.
*B62D 21/11*    (2006.01)
*B60G 3/20*    (2006.01)
*B62D 21/15*    (2006.01)

(52) U.S. Cl.
CPC ............... *B62D 21/11* (2013.01); *B60G 3/20* (2013.01); *B62D 21/155* (2013.01); *B60G 2200/18* (2013.01)

(58) Field of Classification Search
CPC ...... B62D 21/05; B62D 21/155; B62D 21/11; B62D 21/00

(Continued)

(56) References Cited

U.S. PATENT DOCUMENTS 5,280,957 A * 1/1994 Hentschel ............... B60G 3/20
                                                    280/124.109
5,562,308 A * 10/1996 Kamei ..................... B60G 3/20
                                                    180/377

(Continued)

FOREIGN PATENT DOCUMENTS

JP    H08-058615 A    3/1996
JP    2000-264245 A   9/2000

(Continued)

OTHER PUBLICATIONS

An Office Action; "Notification of Reasons for Refusal," issued by the Japanese Patent Office on Nov. 1, 2016, which corresponds to Japanese Patent Application No. 2015-006991 and is related to U.S. Appl. No. 14/986,909; with English language translation.

*Primary Examiner* — Barry Gooden, Jr.
(74) *Attorney, Agent, or Firm* — Studebaker & Brackett PC (57) ABSTRACT

A sub frame structure of a vehicle comprising a pair of side members with front ends rigidly connected to a floor frame, a rear cross member holding the vicinity of rear ends of the side members, both-side end portions of which are rigidly connected to a rear side frame, the both-side end portions of the rear cross member being positioned on an outward side, in a vehicle width direction, of the side members, a front cross member interconnecting the side members in the vehicle width direction and being positioned in front of the rear cross member, being spaced apart from the rear cross member, and a pair of upper members respectively connecting an upper portion of the rear cross member and an upper portion of the front cross member in a vehicle longitudinal direction at a position above the side member.

7 Claims, 10 Drawing Sheets

(58) Field of Classification Search
USPC ........................................ 296/193.07, 193.08
See application file for complete search history.

(56) References Cited

U.S. PATENT DOCUMENTS

| | | | | |
|---|---|---|---|---|
| 6,511,096 B1* | 1/2003 | Kunert | ................... | B60G 7/02 280/124.109 |
| 7,213,873 B2* | 5/2007 | Murata | ................. | B62D 21/11 296/187.09 |
| 8,511,696 B2* | 8/2013 | Tanaka | .................... | B60G 7/02 280/124.109 |
| 8,579,310 B2* | 11/2013 | Tanaka | .................... | B60G 3/20 280/124.109 |
| 8,616,567 B2* | 12/2013 | Eguchi | .................... | B60G 3/20 267/189 |
| 8,857,836 B2* | 10/2014 | Okuyama | ............... | B60G 3/20 280/124.109 |
| 9,085,329 B2* | 7/2015 | Komiya | ................. | B62D 21/11 |
| 2009/0243272 A1* | 10/2009 | Tanaka | ................... | B60G 3/202 280/794 |
| 2010/0078968 A1* | 4/2010 | Boettcher | ............ | B62D 33/023 296/193.07 |
| 2011/0073390 A1* | 3/2011 | Taguchi | ................... | B60K 1/04 180/65.22 |
| 2012/0256446 A1* | 10/2012 | Yasuhara | ............... | B62D 21/11 296/193.07 |
| 2014/0183834 A1* | 7/2014 | Okuyama | ............... | B60G 3/20 280/124.109 |
| 2014/0252739 A1* | 9/2014 | Otani | ................... | B62D 21/155 280/124.109 |
| 2014/0300137 A1* | 10/2014 | Komiya | ................. | B62D 21/11 296/187.11 |
| 2014/0312654 A1* | 10/2014 | Komiya | ................. | B62D 21/11 296/187.09 |
| 2014/0339856 A1* | 11/2014 | Obata | .................... | B62D 21/11 296/193.08 |
| 2014/0368000 A1* | 12/2014 | Komiya | ................. | B62D 21/11 296/193.07 |
| 2015/0021115 A1* | 1/2015 | Komiya | ............... | B62D 21/11 180/312 |
| 2015/0158530 A1* | 6/2015 | Mikami | ................. | B62D 21/11 280/782 |
| 2015/0298741 A1* | 10/2015 | Winberg | ................. | B62D 21/11 296/187.09 |
| 2015/0314807 A1* | 11/2015 | Nusier | ................... | B62D 21/11 296/187.09 |
| 2015/0367705 A1* | 12/2015 | Schmitt | ................... | B60G 11/50 280/124.106 |
| 2016/0144897 A1* | 5/2016 | Cho | ........ | B62D 21/08 296/204 |
| 2016/0167711 A1* | 6/2016 | Lucas | .................. | B62D 21/152 280/784 |
| 2016/0207571 A1* | 7/2016 | Tanaka | ................. | B62D 21/155 |
| 2016/0207574 A1* | 7/2016 | Tanaka | ................. | B62D 21/155 |
| 2016/0207575 A1* | 7/2016 | Tanaka | ................. | B62D 21/11 |

FOREIGN PATENT DOCUMENTS

| | | |
|---|---|---|
| JP | 2013-169812 A | 9/2013 |
| WO | 2013/187112 A1 | 12/2013 |

\* cited by examiner

SUB FRAME STRUCTURE OF VEHICLE

BACKGROUND OF THE INVENTION

The present invention relates to a sub frame structure of a vehicle in which a rear suspension of the vehicle is supported, for example.

In a vehicle, such as an automotive vehicle, a rear suspension connecting a rear wheel and a vehicle body performs a function of pressing the rear wheel against a road surface and another function of a shock absorber to suppress an impact of unevenness of the road surface on the vehicle body. There are various types of rear suspension performing these functions in a suspension mechanism and the like.

Japanese Patent Laid-Open Publication No. 2013-169812, for example, discloses a multi-link type of rear suspension, in which plural arm members are connected to a rear sub frame, the rear sub frame being formed in a parallel crossed shape by a pair of right-and-left side members and front-and-rear cross members which are spaced apart from each other in a vehicle longitudinal direction and interconnect the side members, respectively.

More specifically, the multi-link type of rear suspension disclosed in the above-described patent document is configured such that a front-side lower arm, a rear-side lower arm, and an upper arm, which are respectively coupled to a rear wheel via a knuckle, are connected to the rear sub frame, and a trailing arm, a front end of which is connected to a vehicle body, is connected to the knuckle.

Herein, in the multi-link type of rear suspension like the one disclosed in the above-described patent document, when an input caused by the unevenness of the road surface or the like acts on the rear wheel from a front side of a vehicle, a load is applied to the rear suspension obliquely upward and rearward.

Herein, a vertical load (load acting in a vertical direction) which is part of the above-described upward-and-rearward oblique load is absorbed by a swinging movement of the arm members, such as the front-side lower arm, and a biasing force of a suspension spring. Meanwhile, a longitudinal load (load acting in the vehicle longitudinal direction) is transmitted to the rear sub frame through the front-side lower arm and the rear-side lower arm and also transmitted to the vehicle body through the trailing arm.

Therefore, in a case in which the trailing arm of the above-described multi-link type of rear suspension of the patent document is omitted, for example, the longitudinal load transmitted to the rear sub frame through the front-side lower arm and the rear-side lower arm may increase. In this case where the load inputted to the sub frame increases, there is a concern that deformation or twisting of the side member caused by the load input may become improperly so large that vibrations or noises may deteriorate, or the maneuverability and stability of the vehicle may deteriorate.

SUMMARY OF THE INVENTION

The present invention has been devised in view of the above-described problem, and an object of the present invention is to provide a sub frame structure of a vehicle which can properly increase the torsional rigidity of the sub frame as a whole by suppressing the deformation or twisting of the side member.

The present invention is a sub frame structure of a vehicle, comprising a pair of right-and-left side members configured such that a distance between rear ends thereof is smaller than a distance between front ends thereof in a plan view, each of the side members including plural arm connection portions to which plural end portions of an arm member supporting a rear wheel of the vehicle are pivotally connected and having a front end rigidly connected to a vehicle body, a rear cross member holding the vicinity of respective rear ends of the pair of right-and-left side members, both-side end portions of which are rigidly connected to the vehicle body, the both-side end portions of the rear cross member being positioned on an outward side, in a vehicle width direction, of the side members, a front cross member interconnecting the pair of right-and-left side members in the vehicle width direction and being positioned in front of the rear cross member, being spaced apart from the rear cross member, and a pair of right-and-left upper members, each of the upper members connecting an upper portion of the rear cross member and an upper portion of the front cross member in a vehicle longitudinal direction at a position above the side member.

According to the present invention, the three-dimensional sub frame can be formed, so that the deformation or twisting of the side member can be suppressed and the torsional rigidity of the sub frame configured such that the distance between their rear ends is smaller than the distance between their front ends can be increased as a whole. Specifically, the pair of right-and-left side members configured as described above can transmit and disperse the load applied to the arm connection portions in an oblique direction along the vehicle width direction and the side members.

Further, the rear cross member and the front cross member can suppress the deformation of the side member caused by the vehicle-width directional load. This rear cross member is pressed at a central portion, in the vehicle width direction, thereof by the load transmitted to the side member because the right-and-left side members are connected to the central portion, in the vehicle width direction, of the rear cross member.

Meanwhile, the front cross member is pressed at the vicinity of its both-side end portions by the load transmitted to the side member because the side members are connected to the vicinity of the both-side end portions of the front cross member. Accordingly, the present sub frame structure of the vehicle can provide different states of deformation between the rear cross member and the front cross member for the input loads having substantially the same input direction.

Since the rear cross member and the front cross member are interconnected by the upper member, the present sub frame structure of the vehicle can suppress the deformation of the pair of right-and-left side members, the front cross member, and the rear cross member more properly. Additionally, since the upper member restricts a vertical move of the front cross member, the deformation of the side member caused by the vertical load can be suppressed.

Thereby, the present sub frame structure of the vehicle can suppress the deformation or twisting of the side member against the longitudinal, vertical or lateral (vehicle-width directional) load. Accordingly, compared with a flat-shaped sub frame being formed in a parallel crossed shape by a pair of right-and-left side members and front-and-rear cross members, the present sub frame structure of the vehicle can increase the torsional rigidity of the sub frame as a whole.

Moreover, since the torsional rigidity of the sub frame as a whole is increased, the present sub frame structure of the vehicle can suppress deteriorations of vibrations, noises or push-up feelings caused by a road-surface input and also improve the maneuverability and stability of the vehicle. Thus, the present sub frame structure of the vehicle has the three-dimensional structure's sub frame, so that this sub frame structure can suppress the deformation or twisting of the side members, thereby improving the torsional rigidity of the sub frame as a whole.

In an embodiment of the present invention, the upper member is arranged on an outward side, in the vehicle width direction, of the side member in the plan view. According to this embodiment, the sub frame structure of the vehicle can suppress the deformation or twisting of the pair of right-and-left side members more properly, thereby increasing the torsional rigidity of the sub frame as a whole more properly.

Specifically, in a case in which different magnitudes of load are inputted to the right-and-left side members at different timings through the arm member, for example, the front cross member deforms with a deformation starting point located at a central portion, in the vehicle width direction, thereof and the side member and the side members deform in different manners from each other.

Accordingly, in a case in which the upper member is arranged between the side members at the front cross member, since the upper member is positioned close to the deformation starting point of the front cross member, the deformation of the front cross member cannot be suppressed sufficiently.

However, since the upper member is arranged on the outward side, in the vehicle width direction, of the side member, the present sub frame structure of the vehicle can suppress the deformation of the front cross member efficiently by means of the rear cross member and the upper member.

Further, since a distance, in the vehicle width direction, from a connection position of the rear cross member and the vehicle body to the upper member is narrow, the present sub frame structure of the vehicle can increase the support rigidity of the upper member by means of the rear cross member can be improved. Thereby, the present sub frame structure of the vehicle can surely suppress the deformation of the front cross member by means of the upper member.

Accordingly, even in the case in which the different magnitudes of load are inputted to the right-and-left side members at the different timings through the arm member, the present sub frame structure of the vehicle can suppress the deforming of the side member more properly.

Thus, since the upper member is arranged on the outward side, in the vehicle width direction, of the side member, the present sub frame structure of the vehicle can suppress the deformation or twisting of the right-and-left side members more properly, thereby increasing the torsional rigidity of the sub frame as a whole.

In another embodiment of the present invention, the side member is configured to curve obliquely forward and outward, and the front cross member is connected to a curve portion of the side member where the side member curves obliquely forward and outward.

According to this embodiment, the present sub frame structure of the vehicle can increase the bending rigidity of the curve portion of the side member which may easily become the bending-deformation starting point. Therefore, since the present sub frame structure of the vehicle can increase the bending deformation of the right-and-left side members, the torsional rigidity of the sub frame can be increased as a whole.

In another embodiment of the present invention, the front cross member and the rear cross member are configured to cover over each of the pair of right-and-left side members from an upper face of the side member to a lower face of the side member. Herein, covering over the side member from the upper face of the side member to the lower face of the side member means to cover over an upper face, at least one side face, and a lower face of a quadrilateral-tubular shaped side member, for example, or to cover a roughly semicircular area of a cylindrical side member, for example.

According to this embodiment, the present sub frame structure of the vehicle can ensure a properly-long joint portion of the front cross member, the rear cross member, and the side member. Thereby, the right-and-left side members can be surely held by the front cross member and the rear cross member, so that the deformation of the side member can be surely restrained.

Further, since the length of the joint portion can be properly long, the present sub frame structure of the vehicle can disperse a stress at the connection portion and ensure a mechanical strength at the joint portion.

Accordingly, since the front cross member and the rear cross member cover over the side member from its upper face to its lower face, respectively, the present sub frame structure of the vehicle can suppress the deformation or twisting of the side member more surely and ensure the strength of the joint portion.

Other features, aspects, and advantages of the present invention will become apparent from the following description which refers to the accompanying drawings.

DETAILED DESCRIPTION OF THE INVENTION

Hereafter, embodiments of the present invention will be described referring to the drawings.

Embodiment 1

Figure 1:
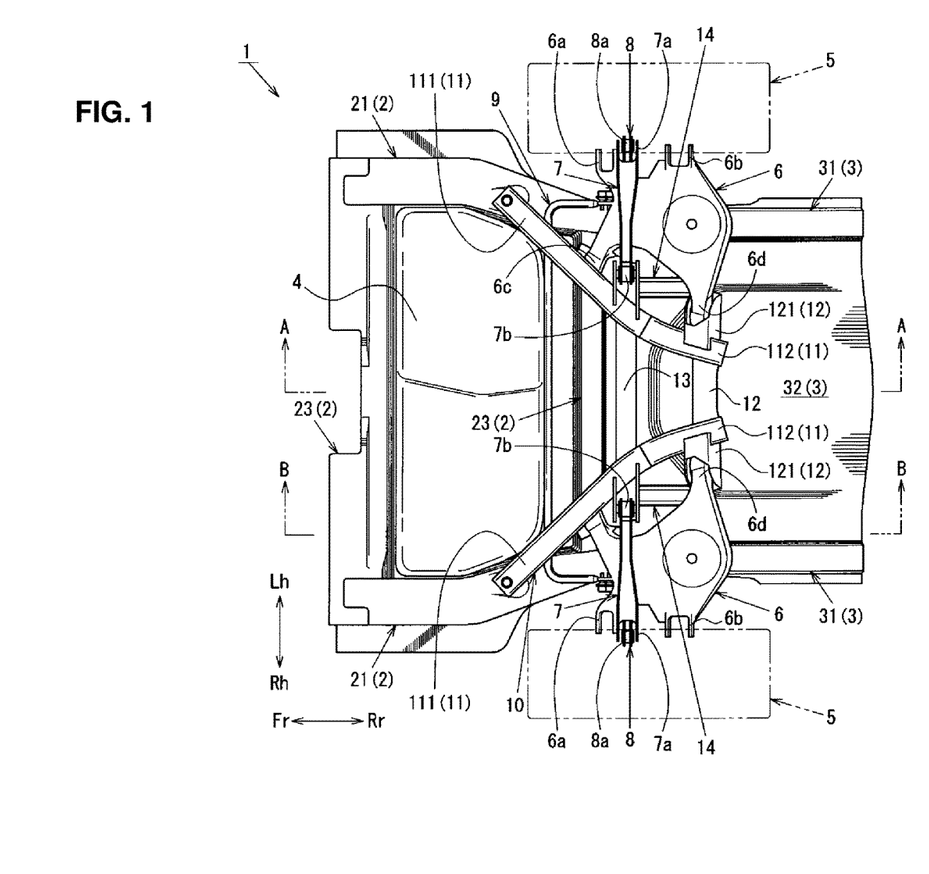
FIG. 1 is a bottom view of a rear sub frame in a state in which the rear sub frame is attached to a vehicle body.
Figure 2:
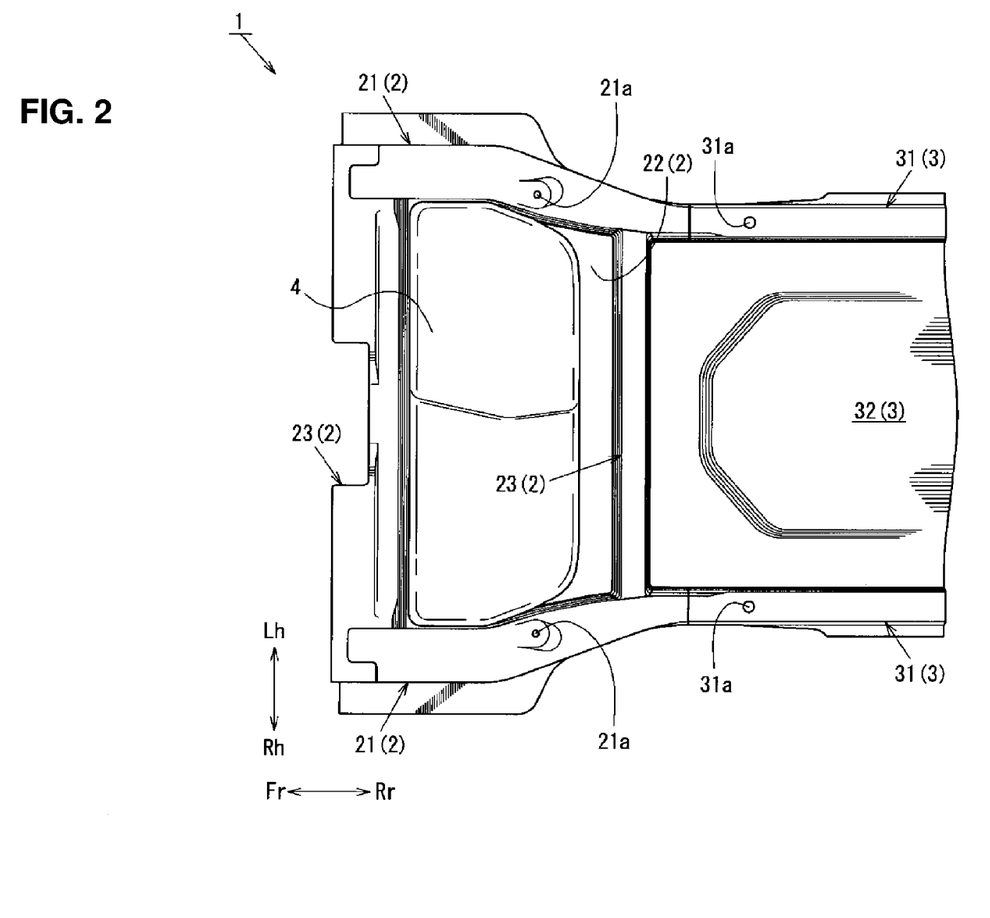
FIG. 2 is a bottom view of the vehicle body in a state in which the rear sub frame is detached.
Figure 3:
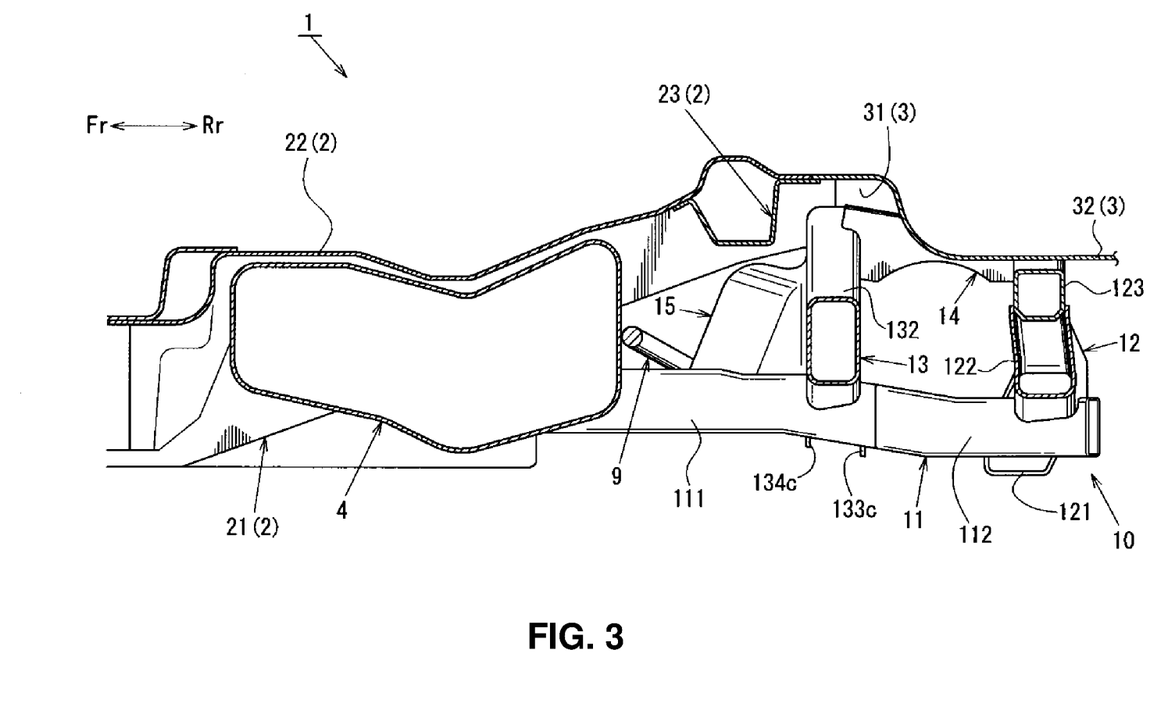
FIG. 3 is a sectional view taken along line A-A of FIG. 1.
Figure 4:
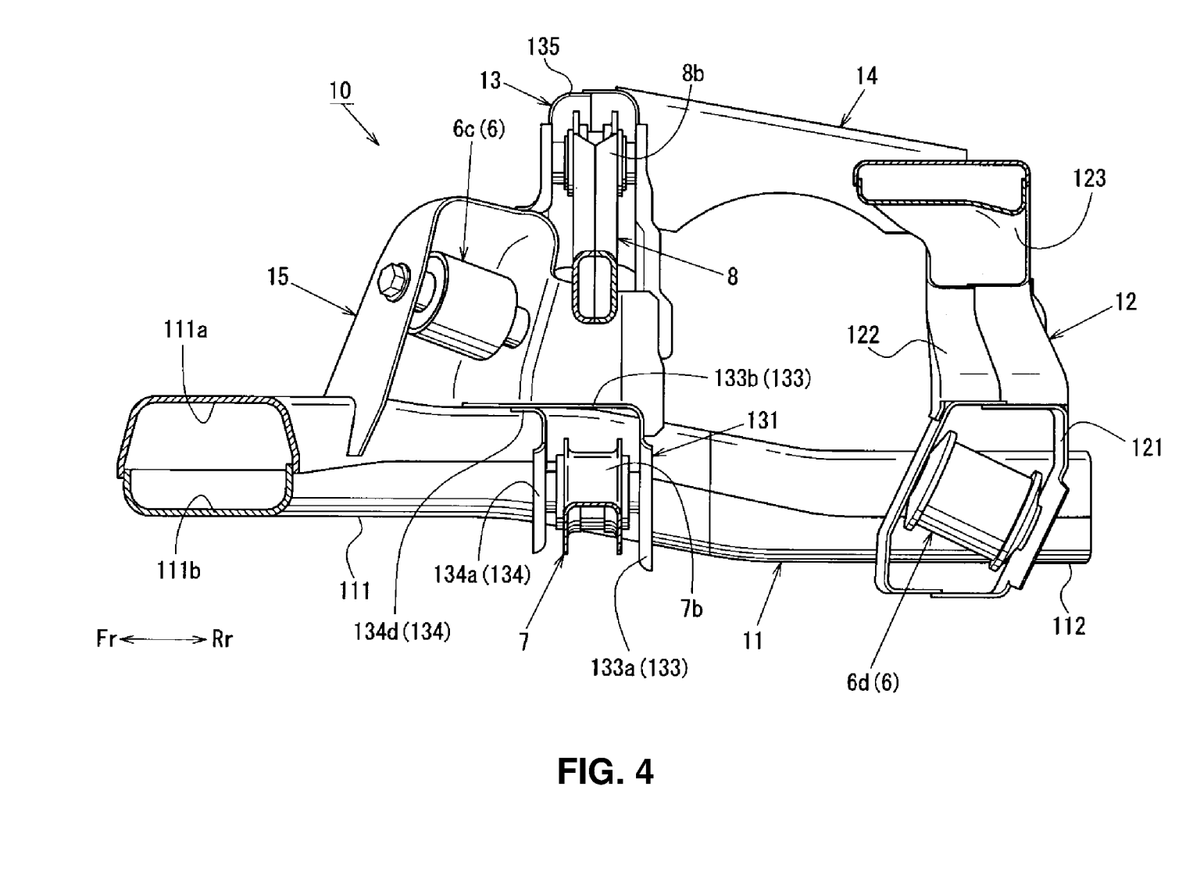
FIG. 4 is a sectional view taken along line B-B of FIG. 1.
Figure 5:
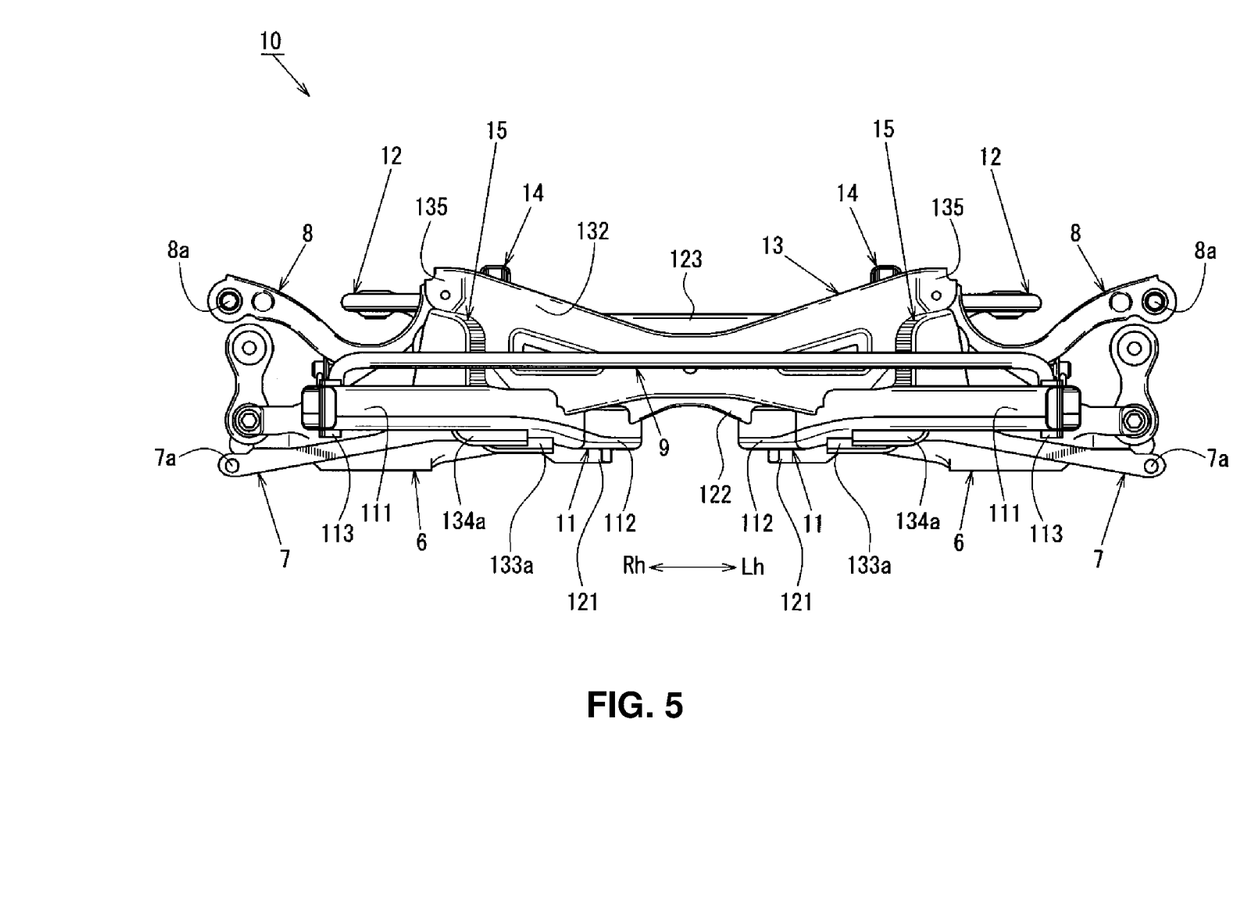
FIG. 5 is a front view of the rear sub frame.

FIG. 1 is a bottom view of a rear sub frame 10 in a state in which the rear sub frame 10 is attached to a vehicle body, FIG. 2 is a bottom view of the vehicle body in a state in which the rear sub frame 10 is detached, FIG. 3 is a sectional view taken along line A-A of FIG. 1, FIG. 4 is a sectional view taken along line B-B of FIG. 1, and FIG. 5 is a front view of the rear sub frame 10.

Figure 6:
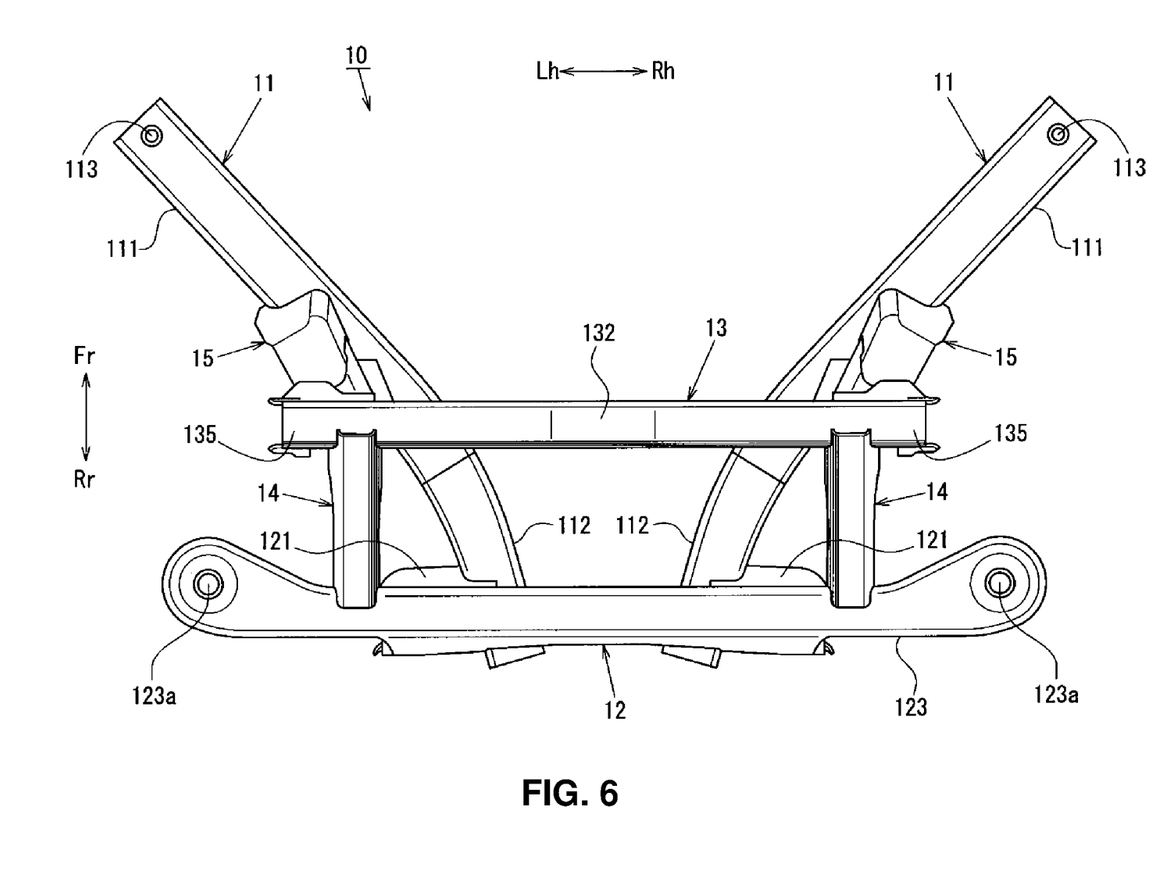
FIG. 6 is a plan view of the rear sub frame.
Figure 7A:
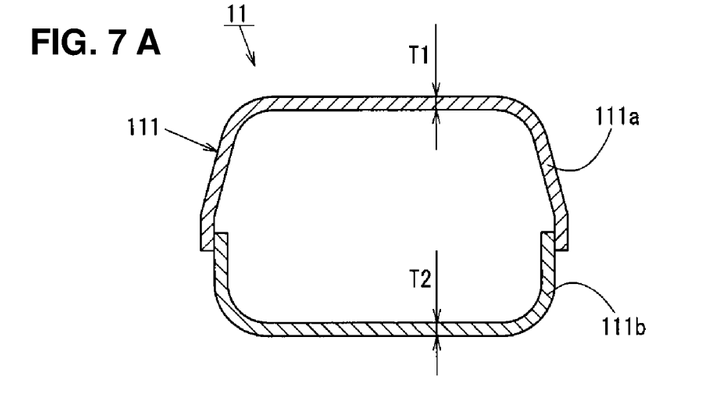
FIG. 7A is a sectional view of a front side member.
Figure 7B:
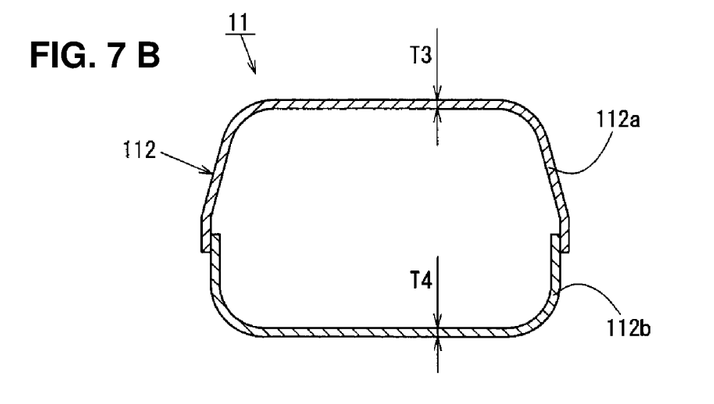
FIG. 7B is a sectional view of a rear side member.
Figure 8:
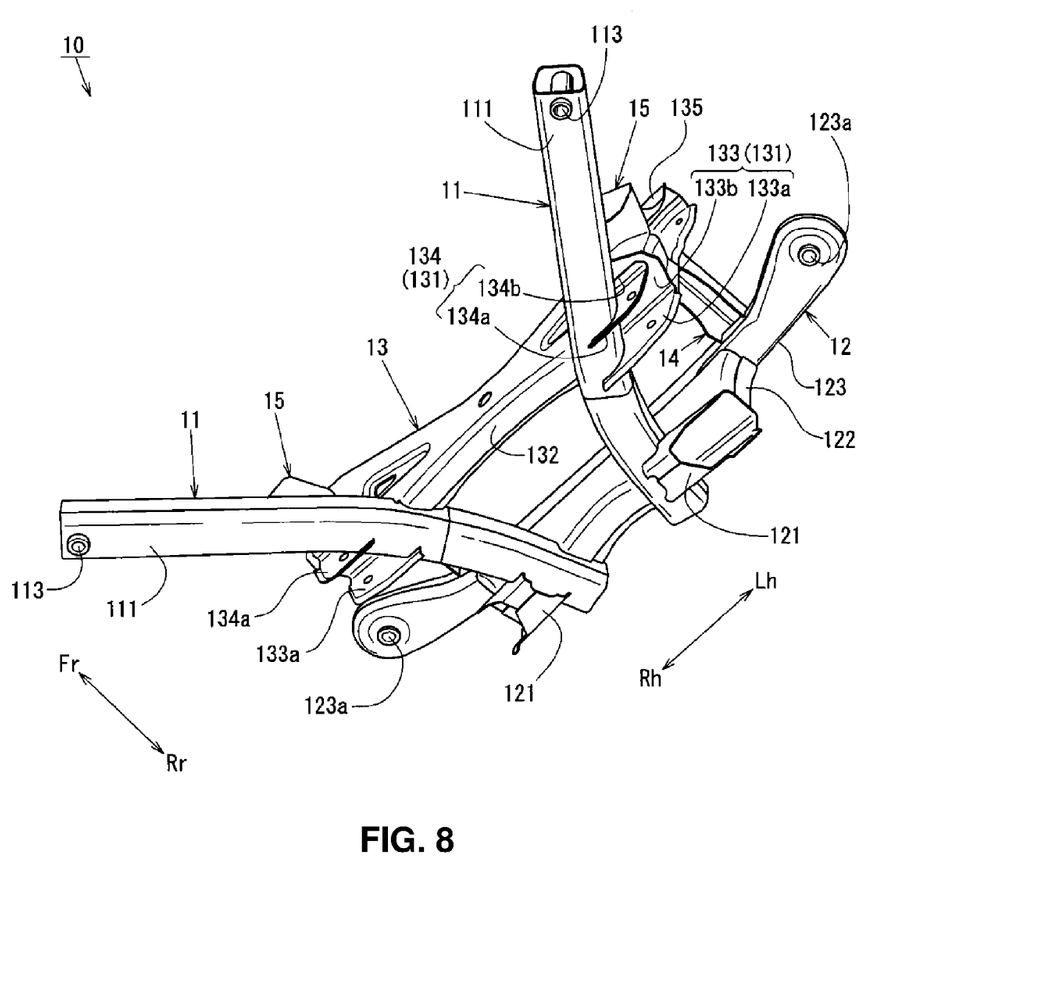
FIG. 8 is a perspective view of the rear sub frame, when viewed from below.
Figure 9:
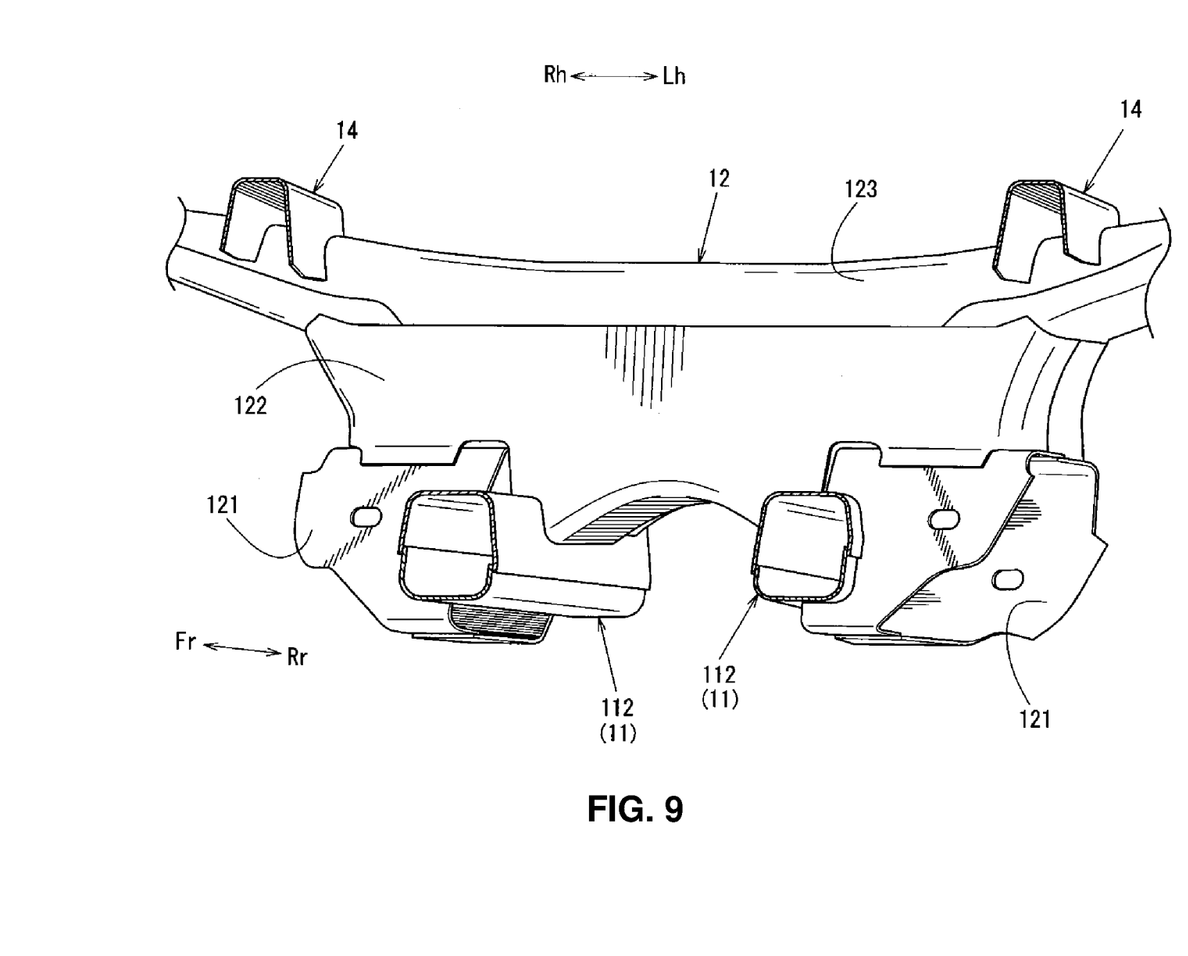
FIG. 9 is a perspective view of a rear cross member.

Further, FIG. 6 is a plan view of the rear sub frame 10, FIG. 7A is a sectional view of a front side member 111 and FIG. 7B is a sectional view of a rear side member 112, FIG. 8 is a perspective view of the rear sub frame 10, when viewed from below, and FIG. 9 is a perspective view of a rear cross member 12.

Herein, illustrations of an upper-side lower arm 6, a lower-side lower arm 7, and an upper arm 8 are omitted in FIG. 3 just for clarification. Further, in FIG. 4, illustration of a vehicle body is omitted and only a front connection portion 6c and a rear connection portion 6d of the upper-side lower arm 6 are illustrated.

In the figures, an arrow Fr shows a vehicle forward direction, an arrow Rr shows a vehicle rearward direction, an arrow Rh shows a vehicle rearward direction, and an arrow Lh shows a vehicle leftward direction. Additionally, an upper side of FIG. 3 is a vehicle upper side and a lower side of FIG. 3 is a vehicle lower side.

First, a lower part of a cabin portion 2 of a vehicle 1 and a lower part of a vehicle rear portion 3 which is positioned in back of the cabin portion 2 will be described. As shown in FIGS. 1 through 3, the lower part of the cabin portion 2 of the vehicle 1 extends in the vehicle longitudinal direction and comprises a pair of right-and-left floor frames 21 as a frame member which forms a vehicle body, a floor panel 22 which is arranged between the both floor frames 21, and a vehicle-body side cross member 23 which interconnects, in the vehicle width direction, respective portions of the floor frames 21 which are positioned near rear ends of the floor frames 21.

Further, at the lower part of the cabin portion 2 is provided a fuel tank 4 in front of the vehicle-body side cross member 23 between the right-and-left floor frames 21. The right-and-left floor frames 21 respectively have a rectangular closed cross section extending rearward, each rear end of which rises obliquely upward and then extends rearward.

Moreover, at the lower part of the floor frame 21 is provided, as shown in FIG. 2, a vehicle-body side front rigid-connection portion 21a which accepts a fastening bolt (not illustrated) and to which a front end (which will be described later) of the rear sub frame 10 is rigidly connected. The vehicle-body side front rigid-connection portion 21a is positioned in front of the vehicle-body side cross member 23 and also a rear end of the fuel tank 4.

The vehicle-body side cross member 23 has a hat-shaped cross section opening upward which extends in the vehicle width direction. This vehicle-body side cross member 23 is fixedly welded to the floor panel 22 and respective side faces of the right-and-left floor frames 21, thereby serving as a reinforcing member for reinforcing the vehicle body. Herein, the vehicle-body side cross member 23 forms a closed cross section together with the lower face of the floor panel 22.

Meanwhile, as shown in FIGS. 2 and 3, the lower part of the vehicle rear portion 3 of the vehicle 1 is configured by a pair of right-and-left rear side frames 31 which extend rearward from respective rear ends of the right-and-left floor frames 21 and serve as a frame member of the vehicle body and a rear floor panel 22 which is provided between the rear side frames 31 and forms a floor face of the vehicle.

As shown in FIGS. 2 and 3, the right-and-left rear side frames 31 are the frame member that is continuous from the right-and-left floor frames 21, and respectively have a rectangular closed cross section which extends rearward from each rear end of the floor frames 21. This rear side frame 31 is configured as shown in FIG. 3 such that its lower face is located at a higher level than the vehicle-body side front rigid-connection portion 21a of the floor frame 21 in a side view.

Moreover, at the lower part of the rear side frame 31 is provided, as shown in FIG. 2, a vehicle-body side rear rigid-connection portion 31a which accepts a fastening bolt (not illustrated) and to which a rear end (which will be described later) of the rear sub frame 10 is rigidly connected. The vehicle-body side rear rigid-connection portion 31a is positioned in back of the vehicle-body side cross member 23, being spaced apart from the vehicle-body side cross member 23.

As shown in FIGS. 1 and 3, the rear sub frame 10, to which a pair of right-and-left upper-side lower arms 6, a pair of right-and-left lower-side lower arms 7, and a pair of right-and-left upper arms 8 which are respectively connected to right-and-left rear wheels 5 through right-and-left knuckles (not illustrated) are pivotally connected, is rigidly connected to the floor frames 21 and the rear side frames 31 at the lower part of the above-described vehicle rear portion 3.

As shown in FIG. 1, the upper-side lower arm 6 is an A-shaped arm member, and includes two rear-wheel side connection portions 6a, 6b to be connected to the knuckle at its outward side and front-and-rear connection portions 6c, 6d to be connected to the rear sub frame 10 at its inward side.

Further, as shown in FIGS. 1 and 3, a stabilizer 9 is attached to a vehicle front side along the rear end of the fuel tank 4 at a level between the floor frames 21 and the rear sub frame 10 in a vehicle vertical direction.

As shown in FIGS. 1 and 4, the lower-side lower arm 7 has a gate-shaped cross section opening downward which extends in the vehicle width direction, and is arranged below the upper-side lower arm 6. This lower-side lower arm 7 includes a rear-wheel side connection portion 7a to be connected to the knuckle at its outward side and a sub-frame side connection portion 7b to be connected to the rear sub frame 10 at its inward side.

As shown in FIGS. 4 and 5, the upper arm 8 is arranged above the lower-side lower arm 7 and has a rectangular closed cross section having a longer side in the vehicle vertical direction. The upper arm 8 extends in the vehicle width direction and is configured in a curve shape such that it protrudes downward in a front view. This upper arm 8 includes a rear-wheel side connection portion 8a to be connected to the knuckle at its outward side and a sub-frame side connection portion 8b to be connected to the rear sub frame 10 at its inward side.

The rear sub frame 10 comprises, as shown in FIGS. 1, 4 and 6, a pair of right-and-left side members 11 which are configured to extend obliquely forward and outward from rear ends thereof, a rear cross member 12 which interconnects respective portions of the right-and-left side members 11 which are positioned near the respective rear ends of the side members 11, a front cross member 13 which interconnects the right-and-left side members 11 at a position which is located in front of the rear cross member 12, being spaced apart from the rear cross member 12, and a pair of right-and-left upper members 14 which respectively connect an upper portion of the rear cross member 12 and an upper portion of the front cross member 13 in the vehicle longitudinal direction.

As shown in FIGS. 1, 4 and 6, each of the side members 11, which is formed as a cylindrical member, is configured in a curve shape such that a central portion, in the vehicle longitudinal direction, thereof protrudes inward in a bottom view. Herein, the front cross member 13, which will be described, is connected to respective curve portions of the right-and-left side members 11.

Further, as shown in FIGS. 3 and 4, the side member 11 is configured in a step (bending) shape such that a portion thereof which is located near the rear cross member 12 is positioned below a portion thereof which is located near a front support bracket 15, which will be described later, in a side view.

More specifically, a portion of the side member 11 which is located in back of the front support bracket 15 bends downward and then bends rearward between the front support bracket 15 and the rear cross member 12.

That is, the rear portion of the side member 11 located in back of the front support bracket 15 includes a bending portion which bends downward and another bending portion which bends rearward, whereby the side member 11 is configured in the step (bending) shape in the side view.

The right-and-left side members 11 are configured to extend obliquely forward and outward from their rear ends such that a distance between their rear ends is relatively small and a distance between their front ends is relatively large.

The front side member 111 and the rear side member 112 are jointly welded together such that the side member 11 is formed integrally.

The front side member 111 is provided to extend from the front end of the side member 11 to the curve portion, and connected to the front cross member 13 at the vicinity of its rear end. That is, the front side member 111 is configured in a long shape such that its front part extends obliquely forward and outward, in the vehicle width direction, from the front cross member 13.

The front side member 111 comprises, as shown in FIG. 7A, an upper panel 111*a* which has a U-shaped cross section opening downward and a lower panel 111*b* which has a U-shaped cross section opening upward, which are joined together at their side faces so as to provide a closed cross section of the front side member 111. Herein, a plate thickness T1 of the upper panel 111*a* is roughly equal to a plate thickness T2 of the lower panel 111*b*, and the plate thickness of those are set at values necessary for transmitting a collision load caused by a vehicle rear collision, for example.

Further, as shown in FIGS. 6 and 8, the front end of the front side member 111 has a front fastening hole 113, into which a fastening bolt (not illustrated) to be screwed to the vehicle-body side front rigid-connection portion 21*a* of the floor frame 21 is inserted. The front fastening hole 113 is formed by an inside space of a metal-made cylindrical body which is provided at the front side member 111 such that it penetrates the front side member 111 vertically.

The rear side member 112 is, as shown in FIGS. 1 and 6, configured in the step (bending) shape in the side face such that it extends slightly inward and rearward from the rear end of the front side member 111.

The rear side member 112 has a longitudinal length which is shorter than the front side member 111 and such that it projects rearward beyond a rear face of the rear cross member 12.

The rear side member 112 comprises, as shown in FIG. 7B, an upper panel 112*a* which has a U-shaped cross section opening downward and a lower panel 112*b* which has a U-shaped cross section opening upward, which are joined together at their side faces so as to provide a closed cross section of the rear side member 112.

Herein, a plate thickness T3 of the upper panel 112*a* is roughly equal to a plate thickness T4 of the lower panel 112*b*, and the plate thickness of those are set to be thinner than the plate thickness T1, T2. That is, the rear side member 112 is configured to be weaker than the front side member 111 against the collision load caused by the vehicle rear collision, for example.

To an upper face of the side member 11 described above is, as shown in FIG. 4, fixedly welded the front support bracket 15 at which the front connection portion 6*c* of the upper-side lower arm 6 is supported.

More specifically, the front support bracket 15 is positioned close to a front side of the front cross member 13, and is fixedly welded to an upper face of the front side member 111 and the front cross member 13.

The front support bracket 15, which is of a boxy shape which opens outward, is configured to provide attachment of the front connection portion 6*c* of the upper-side lower arm 6 by using a fastening bolt (not illustrated) so that the upper-side lower arm 6 can rotate (swing) obliquely upward and rearward as well as obliquely downward and forward.

The rear cross member 12 serves as a holding member for holding the side member 11 in a state in which the rear ends of the right-and-left side members 11 project rearward, a connecting member for connecting the side member 11 to the rear side frame 31, and a support member for pivotally supporting the upper-side lower arm 6, as shown in FIGS. 1 and 5.

Specifically, the rear cross member 12 comprises, as shown in FIGS. 4, 6 and 9, a pair of right-and-left rear member holding members 121 which hold the vicinity of the respective rear ends of the right-and-left side members 11, a rear connecting member 122 which connects the rear member holding members 121 and the right-and-left side members 11, and an upper connecting member 123 which interconnects the vehicle-body side rear rigid-connection portions 31*a* of the right-and-left rear side frames 31 in the vehicle width direction, which are integrally welded together.

As shown in FIGS. 6 and 9, the rear member holding member 121 is made of two metal-made plates which has been bent and attached in the vehicle longitudinal direction and formed in a cylindrical shape having an axis extending in the vehicle width direction. An inward end, in the vehicle width direction, of the rear member holding member 121 is configured in a recess shape such that it contacts an upper face, an outward side face, and a lower face of the rear side member 112 and is welded to these faces.

Further, an outward end, in the vehicle width direction, of the rear member holding member 121 is configured to provide attachment of the rear connection portion 6*d* of the upper-side lower arm 6 by using a fastening bolt (not illustrated) on the outward side of the side member 11 so that the upper-side lower arm 6 can rotate (swing) obliquely upward and rearward as well as obliquely downward and forward.

That is, the rear member holding member 121 serves as a member for holding the rear side member 112 and also a rear support bracket for pivotally supporting the upper-side lower arm 6.

As shown in FIGS. 4 and 9, the rear connecting member 122 is made of two metal-made plates which has been bent and attached in the vehicle longitudinal direction and formed in a rectangular shape, in the front view, having a specified thickness in the vehicle longitudinal direction and an inside hollow space opening upward.

A lower portion of the rear connecting member 122 is configured to contact an upper portion of the rear member holding member 121 and upper and inward side faces of the rear side member 112, and be welded to these portions (faces).

As shown in FIGS. 4, 6 and 9, the upper connecting member 123 is made of two metal-made plates which has been bent and attached in the vehicle vertical direction and formed in a long-oval shape, in the plan view, having a specified thickness in the vehicle vertical direction and an inside hollow space, which is longer than the rear connecting member 122 in the vehicle width direction.

The upper connecting member 123 has, as shown in FIGS. 6 and 8, a pair of rear fastening holes 123a, into which a fastening bolt (not illustrated) to be screwed to the vehicle-body side rear rigid-connection portion 31a of the floor frame 21 is inserted at its both ends. Each of the rear fastening holes 123a is formed by an inside space of a metal-made cylindrical body which is provided at the end of the upper connecting member 123 such that it penetrates the upper connecting member 123 vertically.

The front cross member 13 pivotally supports the lower-side lower arm 7 and serves as a member for interconnecting the right-and-left side members 11 as shown in FIGS. 4, 5 and 8.

Specifically, the front cross member 13 comprises a pair of right-and-left front member holding members 131 which hold the vicinity of the respective rear ends of the right-and-left front side members 111, that is—hold the curve portions of the right-and-left side members 11, and a front connecting member 132 which interconnects the front member holding members 131 in the vehicle width direction, which are integrally welded together.

The front member holding member 131 comprises, as shown in FIGS. 4 and 8, a first hold portion 133 which is positioned on the vehicle rear side and a second hold portion 134 which is provided to face the first hold portion 133, which are integrally formed. The first hold portion 133 comprises a first holding portion 133a which is of a flat-plate shape and has a cutout on its inward side and a first joint portion 133b which is of a flat-plate shape and formed by bending an upper end of the first holding portion 133a toward the vehicle front at a roughly right angle, which are arranged along the outward side face and the lower face of the side member 11 and formed integrally.

The second holding member 134 comprises a second holding portion 134a which is of a flat-plate shape and has a cutout on its inward side and a second joint portion 134b which is of a flat-plate shape and formed by bending an upper end of the second holding portion 134a toward the vehicle front at a roughly right angle, which are arranged along the outward side face and the lower face of the side member 11 and formed integrally. The first hold portion 133 and the second hold portion 134 form the front member holding member 131 by fixedly welding the second joint portion 134b of the second hold portion 134 to a lower face of the first joint portion 133b of the first hold portion 133.

Herein, the first holding portion 133a of the first hold portion 133 and the second holding portion 134a of the second hold portion 134 of the front member holding member 131 form together a lower-side lower-arm support bracket (not illustrated) which provides attachment of the sub-frame side connection portion 7b of the lower-side lower arm 7 by using a fastening bolt (not illustrated) so that the lower-side lower arm 7 can rotate (swing) vertically. In the above-described front member holding member 131, the first joint portion 133b of the first hold portion 133 is fixedly welded to the upper face of the side member 11, respective inward sides of the first holding portion 133a of the first hold portion 133 and the second holding portion 134a of the second hold portion 134 are fixedly welded to the outward side face and the lower face of the side member 11. That is, the front member holding member 131 serves as a holding member for holding the side member 11 and also a support bracket for pivotally supporting the lower-side lower arm 7.

As shown in FIGS. 3 through 5, the front connecting member 132 is made of two metal-made plates which has been bent and attached in the vehicle vertical direction and formed in an X shape, in the front view, having a specified thickness in the vehicle longitudinal direction and an inside hollow space. A lower end of the front connecting member 132 is configured such that it contacts upper and inward side faces of the front side member 111 and is welded to these faces.

Further, at the vicinity of an outward end, in the vehicle width direction, of the front connecting member 132 is provided an upper-arm attachment portion 135 which provides attachment of the sub-frame side connection portion 8b of the upper arm 8 by using a fastening bolt (not illustrated) so that the upper arm 8 can rotate (swing) vertically.

The right-and-left upper members 14 are, as shown in FIG. 6, arranged on the outward side of the side members 11 in the plan view, and each of the upper members 14 interconnects the vicinity of the outward side of the upper portion of the front cross member 13 and the upper portion of the rear cross member 12 in the vehicle longitudinal direction.

The upper member 14 is configured in a gate shape which opens downward in the front view such that it extends in the vehicle longitudinal direction as shown in FIGS. 6 and 8. The upper member 14 is formed and welded so as to ensure a bending rigidity against an input load which is inputted through the upper-side lower arm 6, the lower-side lower arm 7, and the upper arm 8, and provide weakness against the collision load from the vehicle rear.

According to the sub frame structure of the vehicle 1 described above, the three-dimensional rear sub frame 10 can be formed, so that the deformation or twisting of the side member 11 can be suppressed and the torsional rigidity of the rear sub frame 10 can be increased as a whole.

Specifically, the pair of right-and-left side members 11 configured as described above can transmit and disperse the load applied to the front support bracket 15 and the rear member holding member 121 in an oblique direction along the vehicle width direction and the side members 11.

Further, the rear cross member 12 and the front cross member 13 can suppress the deformation of the side member 11 caused by the vehicle-width directional load. This rear cross member 12 is pressed at a central portion, in the vehicle width direction, thereof by the load transmitted to the side member 11 because the right-and-left side members 11 are welded to the central portion, in the vehicle width direction, of the rear cross member 12.

Meanwhile, the front cross member 13 is pressed at the vicinity of its both-side end portions by the load transmitted to the side members 11 because the side members 11 are welded to the vicinity of the both-side end portions of the front cross member 13. Accordingly, the present sub frame structure of the vehicle 1 can provide different states of deformation between the rear cross member 12 and the front cross member 13 for the input loads having substantially the same input direction.

Since the rear cross member 12 and the front cross member 13 are interconnected by the upper member 14, the present sub frame structure of the vehicle 1 can suppress the deformation of the pair of right-and-left side members 11, the front cross member 13, and the rear cross member 12 more properly. Additionally, since the upper member 14 restricts a vertical move of the front cross member 13, the deformation of the side member 11 by the vertical load can be suppressed.

Thereby, the present sub frame structure of the vehicle 1 can suppress the deformation or twisting of the side member 11 against the longitudinal, vertical or lateral (vehicle-width directional) load. Accordingly, compared with a flat-shaped sub frame being formed in a parallel crossed shape by a pair of right-and-left side members and front-and-rear cross members, the present sub frame structure of the vehicle 1 can increase the torsional rigidity of the rear sub frame as a whole.

Moreover, since the torsional rigidity of the rear sub frame as a whole is increased, the present sub frame structure of the vehicle 1 can suppress deteriorations of vibrations, noises or push-up feelings caused by a road-surface input and also improve the maneuverability and stability of the vehicle. Thus, the present sub frame structure of the vehicle 1 has the three-dimensional rear sub frame 10, so that it can suppress the deformation and twisting of the side member 11, thereby improving the torsional rigidity of the rear sub frame as a whole.

Further, since the upper member 14 is arranged on the outward side, in the vehicle width direction, of the side member 11 in the plan view, the sub frame structure of the vehicle 1 can suppress the deformation or twisting of the pair of right-and-left side members 11 more properly, thereby increasing the torsional rigidity of the rear sub frame 10 as a whole more properly.

Specifically, in a case in which the different magnitudes of load are inputted to the right-and-left side members 11 at the different timings through the upper-side lower arm 6, for example, the front cross member 13 deforms with a deformation starting point located at a central portion, in the vehicle width direction, thereof and the side member 11 and the side members 11 deform in different manners from each other.

Accordingly, in a case in which the upper member 14 is arranged between the side members 11 at the front cross member 13, since the upper member 14 is positioned close to the deformation starting point of the front cross member 13, the deformation of the front cross member 13 cannot be suppressed sufficiently.

However, since the upper member 14 is arranged on the outward side, in the vehicle width direction, of the side member 11, the present sub frame structure of the vehicle 1 can suppress the deformation of the front cross member 13 efficiently by means of the rear cross member 12 the upper member 14.

Further, since a distance, in the vehicle width direction, from a connection position of the rear cross member 12 and the rear side frame 31 to the upper member 14 is narrow, the present sub frame structure of the vehicle 1 can increase the support rigidity of the upper member 14 by means of the rear cross member 12 can be improved. Thereby, the present sub frame structure of the vehicle can surely suppress the deformation of the front cross member 13 by means of the upper member 14.

Accordingly, even in the case in which the different magnitudes of load are inputted to the right-and-left side members 11 at the different timings through the upper-side lower arm 6, the present sub frame structure of the vehicle 1 can suppress the deforming of the side member 11 more properly.

Thus, since the upper member 14 is arranged on the outward side, in the vehicle width direction, of the side member 11, the present sub frame structure of the vehicle 1 can suppress the deformation or twisting of the right-and-left side members 11 more properly, thereby increasing the torsional rigidity of the rear sub frame as a whole.

Also, the side member 11 is configured to curve obliquely forward and outward, and the front cross member 13 is welded to the curve portion of the side member 11 where the side member 11 curves obliquely forward and outward.

Accordingly, the present sub frame structure of the vehicle 1 can increase the bending rigidity of the curve portion of the side member 11 which may easily become the bending-deformation starting point. Therefore, since the present sub frame structure of the vehicle 1 can increase the bending deformation of the right-and-left side members 11, the torsional rigidity of the rear sub frame can be increased as a whole.

Moreover, the front cross member 13 and the rear cross member 12 are configured to cover over the side member 11 from its upper face to its lower face, the present sub frame structure of the vehicle 1 can ensure a properly-long welding portion of the front cross member 13, the rear cross member 12, and the side member 11. Thereby, the right-and-left side members 11 can be surely held by the front cross member 13 and the rear cross member 12, so that the deformation of the side member 11 can be surely restrained.

Further, since the length of the welding portion can be properly long, the present sub frame structure of the vehicle 1 can disperse a stress at the connection portion and ensure a mechanical strength at the welding portion.

Accordingly, since the front cross member 13 and the rear cross member 12 cover over the side member 11 from its upper face to its lower face, respectively, the present sub frame structure of the vehicle 1 can suppress the deformation or twisting of the side member 11 more surely and ensure the strength of the joint portion.

Embodiment 2

Figure 10:
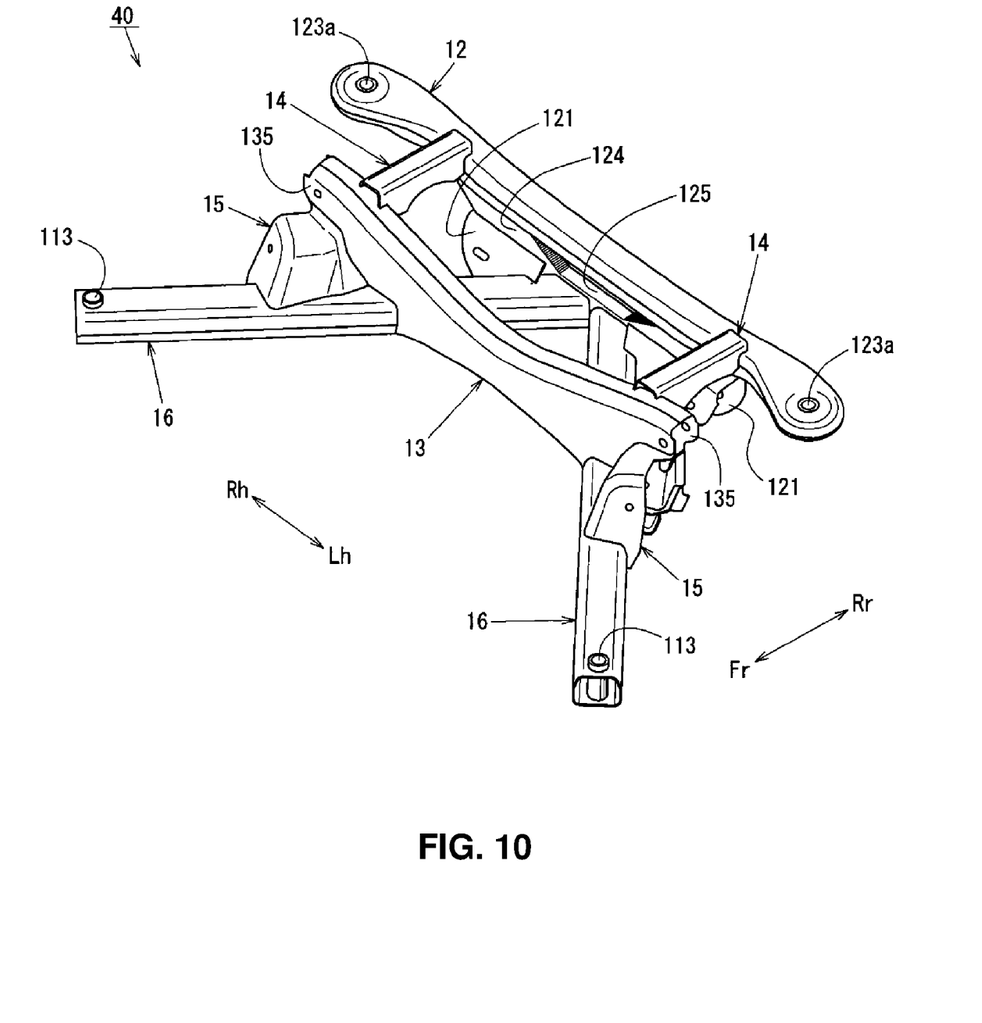
FIG. 10 is a perspective view showing an exterior view of a rear sub frame according to a second embodiment, when viewed from above.

Next, another rear sub frame 40 which is more appropriate than the rear sub frame 10 of the first embodiment for improvement of the torsional rigidity of the sub frame as a whole will be described referring to FIG. 10. FIG. 10 is a perspective view showing an exterior view of the rear sub frame 40 according to a second embodiment, when viewed from above.

The rear sub frame 40 of the second embodiment has the same elements as the rear sub frame 10 of the above-described first embodiment except respective shapes of the side member and the rear cross member. Therefore, those same elements are denoted by the same reference characters, and specific descriptions of those are omitted here.

The rear sub frame 40 of the second embodiment comprises, as shown in FIG. 10, a pair of right-and-left straight-shaped side members 16 which are configured to extend obliquely forward and outward from rear ends thereof, the rear cross member 12 which holds the vicinity of respective rear ends of the side members 16, the front cross member 13 which interconnects the right-and-left side members 16 at a position which is located in front of the rear cross member 12, being spaced apart from the rear cross member 12, and a pair of right-and-left upper members 14 which respectively connect an upper portion of the rear cross member 12 and an upper portion of the front cross member 13 in the vehicle longitudinal direction.

The side member 16 is formed by a tubular body having a roughly-rectangular closed cross section. Respective rear ends of the right-and-left side members 16 are arranged close to each other in the vehicle width direction and respective front ends of those are arranged apart from each other, so that the right-and-left side members 16 are configured to extend obliquely forward and outward.

As shown in FIG. 10, the rear cross member 12 comprises a pair of right-and-left rear member holding members 121 which hold the vicinity of the respective rear ends of the right-and-left side members 11, a rear connecting member 124 which connects the rear member holding members 121 and the right-and-left side members 16, and the upper connecting member 123 which interconnects the vehicle-body side rear rigid-connection portions 31a of the right-and-left rear side frames 31 in the vehicle width direction, which are integrally welded together.

The rear member holding member 124 is made of two metal-made plates which has been bent and attached in the vehicle longitudinal direction, has a specified thickness in the vehicle longitudinal direction, and is configured in a roughly rectangular shape in the front view such that it has a hollow shape opening upward.

A lower portion of the rear member holding member 124 is configured in a shape such that it contacts an upper portion of the rear member holding member 121 and an upper face and an inward side face of the rear side member 112 and is welded to these portion/faces. Further, the rear connecting member 124 has an opening portion 125 which penetrates longitudinally at a central portion, in the vehicle width direction, thereof. The sub frame structure of the vehicle 1 described above can provide the same effects as the above-described first embodiment.

In correspondence between the present invention and the above-described embodiments, the arm member of the present invention corresponds to the upper-side lower arm 6 of the above-described embodiment. Likewise, the plural end portions of the arm member correspond to the front connection portion 6c and the rear connection portion 6d, the arm connection portion corresponds to the front support bracket 15 and the rear member holding member 121, the vehicle body corresponds to the floor frame 21 and the rear side frame 40, and the sub frame corresponds to the rear sub frame 10 or the rear sub frame 40.

However, the present invention should not be limited to the above-described embodiments, and any other modifications or improvements may be applied within the scope of a spirit of the present invention.

What is claimed is:

1. A sub frame structure of a vehicle, comprising:
   a pair of right-and-left side members configured such that a distance between rear ends thereof is smaller than a distance between front ends thereof in a plan view, each of the side members including plural arm connection portions to which plural end portions of an arm member supporting a rear wheel of the vehicle are pivotally connected and having a front end rigidly connected to a vehicle body;
   a rear cross member holding the vicinity of respective rear ends of the pair of right-and-left side members, both-side end portions of which are rigidly connected to the vehicle body, the both-side end portions of the rear cross member being positioned on an outward side, in a vehicle width direction, of the side members;
   a front cross member interconnecting the pair of right-and-left side members in the vehicle width direction and being positioned in front of the rear cross member, being spaced apart from the rear cross member; and
   a pair of right-and-left upper members, each of the upper members connecting an upper portion of the rear cross member and an upper portion of the front cross member in a vehicle longitudinal direction at a position above each of the side members, said right-and-left upper members being configured in a gate shape which opens downward.

2. The sub frame structure of the vehicle of claim 1, wherein said front cross member and said rear cross member are configured to cover over each of said pair of right-and-left side members from an upper face of each of the side members to a lower face of each of the side members.

3. The sub frame structure of the vehicle of claim 1, wherein said side members are configured to curve obliquely forward and outward, and said front cross member is connected to a curve portion of each of the side members where the side members curve obliquely forward and outward.

4. The sub frame structure of the vehicle of claim 3, wherein said front cross member and said rear cross member are configured to cover over each of said pair of right-and-left side members from an upper face of each of the side members to a lower face of each of the side members.

5. The sub frame structure of the vehicle of claim 1, wherein said upper members are arranged on an outward side, in the vehicle width direction, of said side members in the plan view.

6. The sub frame structure of the vehicle of claim 5, wherein said side members are configured to curve obliquely forward and outward, and said front cross member is connected to a curve portion of each of the side members where the side members curve obliquely forward and outward.

7. The sub frame structure of the vehicle of claim 5, wherein said front cross member and said rear cross member are configured to cover over each of said pair of right-and-left side members from an upper face of each of the side members to a lower face of each of the side members.

* * * * *